UNITED STATES PATENT OFFICE.

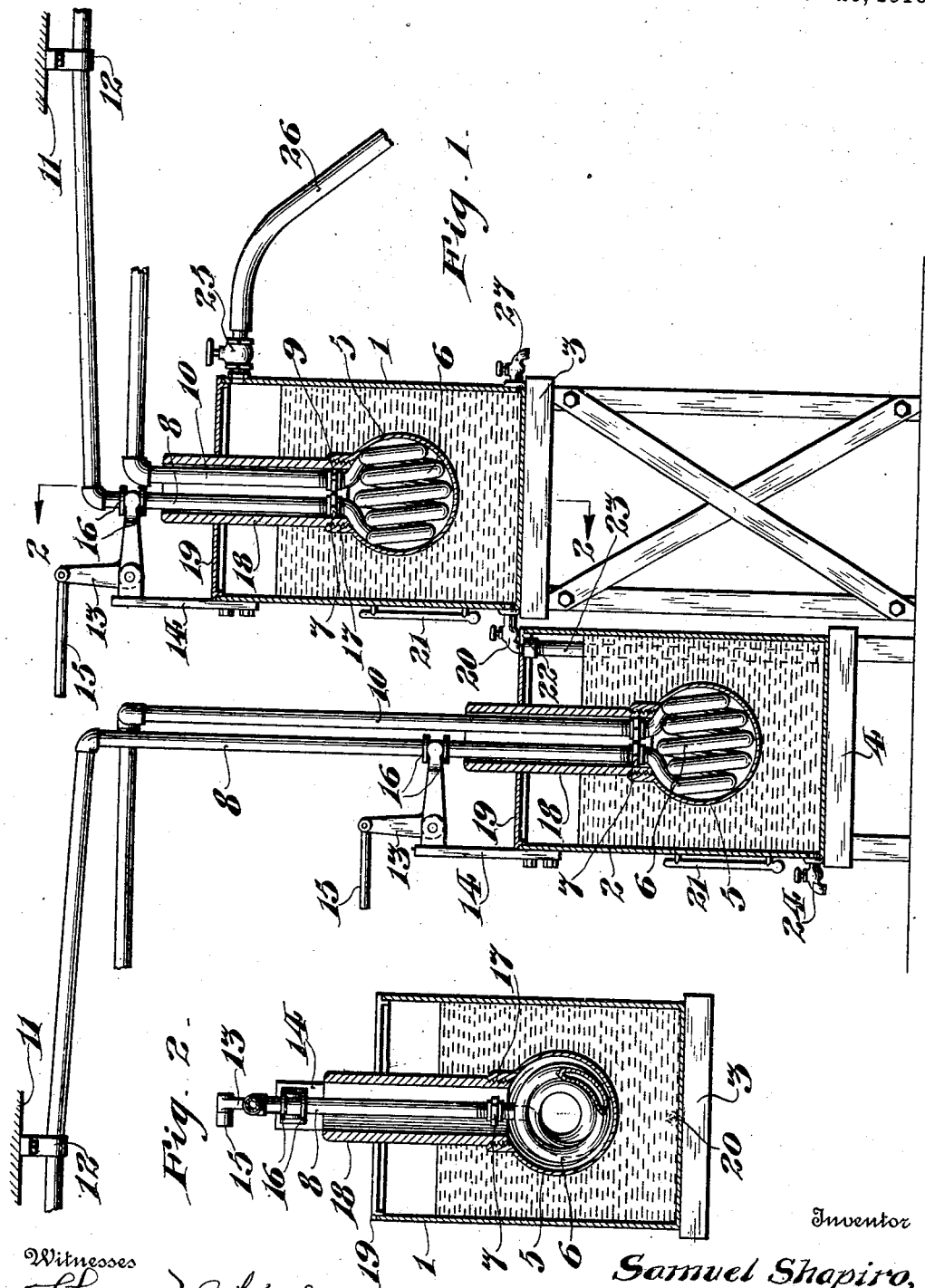

SAMUEL SHAPIRO, OF PHILADELPHIA, PENNSYLVANIA.

COMBINED PASTEURIZING AND REFRIGERATING APPARATUS.

977,230.  Specification of Letters Patent.  Patented Nov. 29, 1910.

Application filed June 22, 1910. Serial No. 568,293.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Combined Pasteurizing and Refrigerating Apparatus, of which the following is a specification.

My invention relates to improvements in combined pasteurizing and refrigerating apparatus, the object of the invention being to provide an improved apparatus for heating and cooling the milk, maintaining the milk at the desired temperature for any desired length of time to conform to the rules and regulations as laid down by the various municipalities, and at the same time keep the milk agitated so as to prevent any separation of the cream from the milk and also prevent any churning action.

A further object is to provide an improved ball or sphere adapted to be heated or cooled, and maintained at the desired temperature, and provide improved means for reciprocating the ball or sphere in the body of the milk.

A further object is to provide an improved apparatus of this character which may be kept perfectly clean and sanitary, in which the milk from the pasteurizer may be transferred to the refrigerating apparatus without breaking up the milk.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improvements, and Fig. 2, is a view in section on the line 2—2 of Fig. 1.

1, represents the pasteurizing tank, and 2 the refrigerating tank, the former supported at an elevation on suitable framework 3, and the latter slightly elevated above the floor upon the frame 4. Each of these tanks is provided with a thermometer 21, so that the temperature of the milk therein can be observed at all times, and each of these tanks is provided with my improved ball or sphere 5. As the construction of the balls or spheres 5 in each of the tanks is precisely alike, the description of one will apply alike to both. Each ball or sphere 5 is hollow, constituting a chamber for a pipe coil 6, one end of said coil being connected by a coupling 7 with an inlet pipe 8, and the other end of said coil by a coupling 9 with an outlet pipe 10. The inlet pipes are preferably supported from the ceiling of the room indicated at 11 by means of brackets 12 at a point removed from the apparatus far enough to give sufficient flexibility to the pipe to allow the ball to be reciprocated in the tank. While, of course, I may employ various means for reciprocating the balls, I have shown one means which comprises a bell-crank-lever 13, pivoted on an upright 14 secured to the tank and connected by a rod 15 with any suitable source of power. One member of this bell-crank-lever is bifurcated to straddle the pipe 8 between flanges 16 thereon, so that when the lever 13 is operated, the ball 5 will be moved vertically in the tank.

The ball 5 is provided with an internally screw-threaded collar 17 into which a tube 18, preferably of wood is screwed, and this tube 18 incloses all of that portion of the pipes 8 and 10 which are located within the tank, so as to keep the milk from contact with the pipes and prevent it from entering the ball.

The inlet pipe 8, of the pasteurizing tank 1, is designed to convey steam to the coil 6 within the ball 5 in said tank, and to maintain said ball at a high temperature. The inlet pipe 8 of the refrigerating tank 2 is designed to convey some refrigerating fluid to the coil 6 in the ball 5 of said tank 2, and these fluids are maintained in circuit through the coil and out through the pipes 10, so that while the ball 5 in tank 1 is maintained at a high temperature, the ball 5 in tank 2 is maintained at a low temperature.

Each tank is provided with a sectional cover 19 fitting the top of the tank. The pasteurizing tank 1 is provided with an outlet cock 20 at its lower end, which projects through a recess 22 in the top of tank 2 and is adapted to be connected by a removable pipe 23 which extends almost to the bottom of tank 2, so that the milk may be conveyed from tank 1 to the bottom of tank 2 without any appreciable fall of the milk, to prevent breaking up of the milk. Tank 2 is provided with an outlet cock 24, from which the cooled milk may be removed from the tank.

25 represents a water inlet cock at the top of tank 1, which is adapted to be connected by a hose 26, with a water supply and a water outlet cock 27 is provided in the lower end of tank 1, the purpose of which will hereinafter appear.

The operation is as follows: The milk to be pasteurized is poured into tank 1 and the steam admitted through pipe 8 to the coil 6, and escapes through pipe 10. The steam coil 6 heats the ball 5 to a high temperature and this ball is slowly and continuously reciprocated up and down in the milk by means of the rod 15 and bell-crank-lever 13. The heat of the ball brings the milk to the desired temperature, and its reciprocation agitates the milk sufficiently to prevent any separation of the cream from the milk. This operation is continued until the milk is maintained at the desired temperature for the desired length of time to conform to the laws and regulations of any particular municipality.

When cock 20 is opened, the pasteurized milk will flow through pipe 23 into tank 2. Here the milk receives a refrigerating action of the ball 5 in tank 2, as the coil 6 in this ball is supplied with some refrigerating fluid through its pipe 8, and the ball is reciprocated as above explained. When the milk has been subjected to the desired refrigeration to bring it to the temperature desired, it is removed through the cock 24.

As soon as the milk is allowed to flow from tank 1 into tank 2, cock 20 is closed and water is admitted through cock 25 and afterward removed through cock 27. As this tank 1 is hot, any of the milk sticking to the same or to the ball 5 would burn if allowed to remain, but the water which is permitted through the cock 25 thoroughly cleanses the tank, and if desired, this water may be allowed to remain in the tank for a time while the ball is agitated to bring the water to the desired temperature. After this tank is clean, cock 20 may be opened, while cock 25 is opened, so that the water may flow into tank 2 and cleanse the latter as well.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a tank, of a ball or sphere mounted to move in the tank, and a pipe constituting a fluid passage to regulate the temperature of the ball, located within the ball and in contact with the inner face thereof, substantially as described.

2. In an apparatus of the character described, the combination with a tank, of a hollow ball or sphere mounted to move in the tank, a pipe coil in the ball or sphere and contacting with the inner face thereof, and pipes connected to the ends of said coils for compelling a passage of fluid through the coil, substantially as described.

3. In an apparatus of the character described, the combination with a tank, of a hollow ball or sphere mounted to move in the tank, a pipe coil in the ball or sphere and contacting with the inner face thereof, pipes connected to the ends of said coils for compelling a passage of fluid through the coil, and means for reciprocating the ball in the tank, substantially as described.

4. In an apparatus of the character described, the combination with a tank, of a hollow ball or sphere mounted to move in the tank, a pipe coil in the ball or sphere, pipes connected to the ends of said coils for compelling a passage of fluid through the coil, means for reciprocating the ball in the tank, and a tube inclosing that portion of said pipes within the tank and secured to the ball, substantially as described.

5. In an apparatus of the character described, the combination with a tank, a hollow ball or sphere within the tank, an internally screw-threaded collar on the ball, a tube screwed into said collar, a coil within the ball, and supply and exhaust pipes in said tube connected to the respective ends of said coil, substantially as described.

6. In an apparatus of the character described, the combination with a tank, a hollow ball or sphere within the tank, an internally screw threaded collar on the ball, a tube screwed into said collar, a coil within the ball, supply and exhaust pipes in said tube connected to the respective ends of said coil, an upright on said tank, a bell-crank-lever pivoted to said upright, one member of said lever engaging one of said pipes, and means engaging the other member of said lever for operating the lever, substantially as described.

7. In an apparatus of the character described, the combination with a pasteurizing tank and a cooling tank, the former located at a higher elevation than the latter, balls or spheres mounted to reciprocate in said tanks, means for conveying a heating fluid to the ball in the pasteurizing tank, means for conveying a refrigerating fluid to the ball in the refrigerating tank, an outlet cock at the lower end of each tank, a pipe removably connected to the said cock on the pasteurizing tank, and terminating near the bottom of the refrigerating tank, refrigerators on said tanks, a water inlet cock near the top of the pasteurizing tank, and a water outlet cock at the bottom of said pasteurizing tank, substantially as described.

In testimony whereof I have signed my name to this specification in the presence of two subscribing witnesses.

SAMUEL SHAPIRO.

Witnesses:
R. H. KRENKEL,
CHARLES E. POTTS.